(12) United States Patent
Feidelson et al.

(10) Patent No.: US 6,345,261 B1
(45) Date of Patent: Feb. 5, 2002

(54) CUSTOMER LOYALTY INVESTMENT PROGRAM

(75) Inventors: Robert S. Feidelson, Bedford; C. Eric Peters; Timothy C. Parrott, both of New York, all of NY (US); Joseph P. Larizza, Hoboken, NJ (US)

(73) Assignee: Stockback Holdings, Inc., New York, NY (US)

( * ) Notice: Subject to any disclaimer, the term of this patent is extended or adjusted under 35 U.S.C. 154(b) by 0 days.

(21) Appl. No.: 09/400,417

(22) Filed: Sep. 30, 1999

(51) Int. Cl.[7] .............................................. G06F 17/60
(52) U.S. Cl. .......................................... 705/14; 705/35
(58) Field of Search ................................ 705/1, 14, 26, 705/35, 36

(56) References Cited

U.S. PATENT DOCUMENTS

| | | | |
|---|---|---|---|
| 4,723,212 A | 2/1988 | Mindrum et al. | 705/14 |
| 4,750,119 A | 6/1988 | Cohen et al. | 705/14 |
| 4,910,672 A | 3/1990 | Off et al. | 705/14 |
| 4,992,940 A | 2/1991 | Dworkin | 705/26 |
| 5,023,372 A | 6/1991 | Burton | 562/598 |
| 5,056,019 A | 10/1991 | Schultz et al. | 705/14 |
| 5,113,482 A | 5/1992 | Lynne | 706/23 |
| 5,117,355 A | 5/1992 | McCarthy | 705/14 |
| 5,173,851 A | 12/1992 | Off et al. | 705/14 |
| 5,193,056 A | 3/1993 | Boes | 705/36 |
| 5,200,889 A | 4/1993 | Mori | 705/14 |
| 5,202,826 A | 4/1993 | McCarthy | 364/405 |
| 5,233,514 A | 8/1993 | Ayyoubi et al. | 705/14 |
| 5,287,268 A | 2/1994 | Mccarthy | 705/14 |
| 5,297,026 A | 3/1994 | Hoffman | 705/14 |
| 5,353,218 A | 10/1994 | DeLapa et al. | 364/401 |
| 5,467,269 A | 11/1995 | Flaten | 705/14 |
| 5,483,444 A | 1/1996 | Heintzeman et al. | 705/5 |
| 5,502,636 A | 3/1996 | Clarke | 364/401 |
| 5,513,102 A | 4/1996 | Auriemma | 705/14 |
| 5,537,314 A | 7/1996 | Kanter | 705/14 |
| 5,588,649 A | 12/1996 | Blumberg et al. | 436/18 |

(List continued on next page.)

FOREIGN PATENT DOCUMENTS

| | | |
|---|---|---|
| GB | 1 565 286 | 4/1980 |
| WO | 93/12489 | 6/1993 |
| WO | WO 94/04979 | 3/1994 |
| WO | WO 98/38562 | 9/1998 |
| WO | WO 99/49405 | 9/1999 |

OTHER PUBLICATIONS

Veverka, Mark, "Despite Yellow Flags, New Internet Portal Plans to Give Away Stock", San Francisco Chronicle, Wednesday, Apr. 7, 1999. p. D–1.*

(List continued on next page.)

Primary Examiner—Eric W. Stamber
Assistant Examiner—Donald L. Champagne
(74) Attorney, Agent, or Firm—Pennie & Edmonds LLP (57) ABSTRACT

The present invention is directed to a customer loyalty investment program system and method where purchase rebates are used to provide the customer with an important fund including merchant securities. The system illustratively includes a web server containing a web site and a database server containing a member information, merchant information, fund information, purchase/rebate information, on-line financial products/services information, and an input/output means. The method may include negotiating rebate percentages with merchants, registering members, receiving rebates from the merchants based on member purchases, investing the rebates in the fund, including securities of at least one merchant, and issuing shares in the fund to members based on rebates received as a result of their respective purchases. Advantageously, the composition of the fund preferably reflects the rebates received from the merchants. In the credit card embodiment, rebates may be received from both a credit card issuer and merchants agreeing to provide rebates based on member purchases using the credit card.

22 Claims, 5 Drawing Sheets

U.S. PATENT DOCUMENTS

| | | | |
|---|---|---|---|
| 5,612,868 A | 3/1997 | Off et al. | 705/14 |
| 5,638,457 A | 6/1997 | Deaton et al. | 382/100 |
| 5,649,114 A | 7/1997 | Deaton et al. | 705/14 |
| 5,652,421 A | 7/1997 | Veeneman et al. | 235/381 |
| 5,671,334 A | 9/1997 | Lynne | 706/23 |
| 5,687,286 A | 11/1997 | Bar-Yam | 704/232 |
| 5,687,322 A | 11/1997 | Deaton et al. | 705/14 |
| 5,689,100 A | 11/1997 | Carrithers et al. | 235/380 |
| 5,697,844 A | 12/1997 | Von Kohorn | 463/40 |
| 5,704,366 A | 1/1998 | Tacklind et al. | 600/529 |
| 5,708,780 A | 1/1998 | Levergood et al. | 395/200.12 |
| 5,712,990 A | 1/1998 | Henderson | 705/28 |
| 5,713,795 A | 2/1998 | Kohorn | 463/17 |
| 5,715,314 A | 2/1998 | Payne et al. | 380/24 |
| 5,715,398 A | 2/1998 | Lubenow et al. | 705/7 |
| 5,715,403 A | 2/1998 | Stefik | 705/44 |
| 5,716,273 A | 2/1998 | Yuen | 463/29 |
| 5,724,424 A | 3/1998 | Gifford | 380/24 |
| 5,729,693 A | 3/1998 | Holda-Fleck | 705/14 |
| 5,733,131 A | 3/1998 | Park | 434/307 R |
| 5,734,476 A | 3/1998 | Dlugos | 356/380 |
| 5,734,722 A | 3/1998 | Halpern | 714/798 |
| 5,734,838 A | 3/1998 | Robinson et al. | 705/14 |
| 5,749,785 A | 5/1998 | Rossides | 463/25 |
| 5,761,648 A | 6/1998 | Golden et al. | 705/14 |
| 5,765,141 A | 6/1998 | Spector | 705/14 |
| 5,774,870 A | 6/1998 | Storey | 705/14 |
| 5,787,404 A * | 7/1998 | Fernandez-Holmann | 705/35 |
| 5,794,207 A | 8/1998 | Walker et al. | 705/1 |
| 5,794,210 A | 8/1998 | Goldhaber et al. | 705/14 |
| 5,806,045 A | 9/1998 | Biorge et al. | 705/14 |
| 5,819,228 A | 10/1998 | Spiro | 705/2 |
| 5,832,457 A | 11/1998 | O'Brien et al. | 705/14 |
| 5,848,396 A | 12/1998 | Gerace | 705/10 |
| 5,855,008 A | 12/1998 | Goldhaber et al. | 705/14 |
| RE36,116 E | 2/1999 | McCarthy | 705/16 |
| 5,892,827 A | 4/1999 | Beach et al. | 705/76 |
| 5,897,620 A | 4/1999 | Walker et al. | 705/5 |
| 5,915,007 A | 6/1999 | Klapka | 379/144 |
| 5,915,244 A | 6/1999 | Jack et al. | 705/14 |
| 5,923,016 A | 7/1999 | Fredregill et al. | 235/380 |
| 5,923,018 A | 7/1999 | Kameda et al. | 235/385 |
| 5,924,072 A | 7/1999 | Havens | 705/1 |
| 5,956,695 A | 9/1999 | Carrithers et al. | 705/14 |
| 5,970,480 A * | 10/1999 | Kalina | 705/37 |
| 5,991,736 A | 11/1999 | Ferguson et al. | 705/14 |
| 6,064,985 A | 5/2000 | Anderson | 705/36 |
| 6,070,153 A * | 5/2000 | Simpson | 705/36 |

OTHER PUBLICATIONS

"They're Your eyeballs —Own them!", http://myownempire.com/, May 24, 1999.

"GMCard": Five pages, including "Frequency Asked Questions", copied on Dec. 20, 2000 from http://www.gmcard.com/generic/a_indexabout.html.*

"hcsapplication": "Answers to your questions about The New GM card" copied on Dec. 20, 2000 from https://www.hcsapplication.com/ecah3297.html.*

"Detroit News": Article dated Jan. 9, 1996 copied on Dec. 20, 2000 from http://www.detnews.com/menu/31368.htm.* www.netcentives.com
www.mypoints.com
www.247media.com
www.alladvantage.com
www.beenz.com
www.coolsavings.com
www.cybergold.com
www.ebates.com
www.ecentives.com
www.hotcoupons.com
www.realtimemedia.com
www.webstakes.com
www.catalinamerketing.com

* cited by examiner

CUSTOMER LOYALTY INVESTMENT PROGRAM

FIELD OF THE INVENTION

The present invention is directed to a customer loyalty investment program. In one embodiment, the system and method are used in e-commerce. In another embodiment, they may be used for on-line and/or off-line commerce.

BACKGROUND OF THE INVENTION

Merchants and credit card companies have developed a number of customer award programs in an attempt to enhance customer loyalty. For example, merchants have long offered coupons to customers with the hope that they will be enticed to purchase a product with the coupon and subsequently develop some loyalty to the product or the merchant. More recently, merchants and credit card companies have set up programs where customers earn award points through the purchase of products or services with a credit card. The award points may then be redeemed towards other products or services offered by merchants.

As the Internet has gained in popularity as a shopping destination, similar customer award programs have been developed. For example, U.S. Pat. No. 5,774,870 describes a fully integrated on-line award program wherein a user earns award points by purchasing products on the offering entity's web site. The offering entity keeps track of these award points, and they may be redeemed by the user to purchase products from an on-line award catalog displayed on the offering entity's web site.

Over the years, investment-based customer award programs have also been offered to customers. For example, U.S. Pat. No. 5,297,026 describes a credit card based customer loyalty program wherein the offering entity determines the total amount of credit card purchases a participating customer has made during a given period, and credits an investment account owned by the customer with up to 10% of that total amount. The offering entity has complete discretion over how the money allocated to the customer is invested. It simply guarantees a percentage return on the investment, or ties the investment to a published interest rate. Importantly, the investment is in no way tied to what products the customers have purchased with the credit card.

Another investment-based customer award program is described in U.S. Pat. No. 5,233,514 to Ayyoubi et al. Ayyoubi et al. describe a customer loyalty program wherein customers receive credit towards the purchase of stock in a given company by sending in UPC labels from products that they have purchased from the given company. The entity collecting the UPC labels authenticates the UPC labels and maintains a computer account that accumulates the amount of credit the customer has earned. The file is kept such that when a customer has accumulated enough credit to purchase a share of stock in the given company, the entity purchases the share in the name of the customer.

This scheme also has flaws. First, the rebate mechanism is cumbersome for both the customers and the offering entity. Customers must remember to cut out UPC labels from product packages and mail the labels to the offering entity to receive any credit for their purchases; and the offering entity has to authenticate, scan, and track the UPC labels. At least in cases where the dollar value represented by a single UPC label is low, the cost of maintaining a customer account is likely to be high relative to the value of the stock accumulating in the customer's account. Moreover, the customer can invest only in the stock of the companies whose products he has bought.

There thus remains a need for a user-friendly investment-based customer award program that is attractive to both merchants and customers.

SUMMARY OF THE INVENTION

In one preferred embodiment, the present invention relates to a method of providing an investment fund comprising the steps of: registering members; receiving rebates from merchants based on purchases made by the members from the merchants; and investing the rebates in the fund; wherein the composition of the fund reflects at least in part the rebates received from the merchants.

In another preferred embodiment, the present invention relates to a method of providing an investment fund based on rebates received from on-line purchases comprising the steps of: registering members; receiving rebates from on-line merchants based on purchases made by the members at the on-line merchants; investing the rebates in the fund; issuing shares in the fund to each respective member based on the rebates received from the on-line merchants as a result of purchases made by that member; and purchasing securities of each respective on-line merchant based on the rebates received from that on-line merchant.

In yet another preferred embodiment, the present invention relates to a method of providing an investment fund based on rebates received from on-line purchases comprising the steps of: registering members using a computer; identifying member purchases made at the on-line merchant sites; receiving rebates from the merchants based on member purchases; investing the rebates in the fund; issuing shares to each member based on the rebates received from merchants as a result of purchases made by that member; for rebates received from public merchants, purchasing securities of each public merchant based on the amount of rebates received from that particular merchant; and for rebates received from private merchants, purchasing securities in the public merchants as a function of the fund's then existing portfolio.

In still another preferred embodiment, the present invention relates to a method, using a computer, of directing management of an investment fund based on rebates received from on-line purchases comprising the steps of: registering members using the computer; maintaining storage information including member database information relating to participating members, merchant database information relating to merchants that have agreed to provide rebates for member purchases, rebate database information, and fund database information; receiving rebate data information from the on-line merchants relating to member purchases made at the on-line merchants; updating the stored rebate database information; and generating information relating to the issuance of shares to each respective member based on the rebate data information and information relating to the purchase of securities issued by each respective on-line merchant based on the rebate data information.

In another preferred embodiment, the present invention relates to a system for administering an investment fund, comprising: means for registering members; means for receiving rebates from merchants based on member purchases made at the merchants; means for investing the rebates in the fund; means for issuing shares in the investment fund to each respective member based on rebates received as a result of his purchases; and means for purchasing securities issued by each respective merchant as a function of the rebates received from that merchant.

In yet another preferred embodiment, the present invention relates to a system for administering an investment fund based on rebates received from on-line purchases comprising: a computer system accessible for on-line communication, the computer system comprising a storage that maintains member database information relating to participating members, merchant database information relating to merchants that have agreed to provide rebates for member purchases, rebate database information, and fund database information; and an instruction generating component that generates information relating to the issuance of shares to each respective member based on the amount of rebates received from merchants as a result of purchases made by that member and also generates information relating to the purchase of securities issued by each respective merchant based on the rebates received from that merchant.

The instruction generating component may be coupled to a FTP server so that the information relating to the issuance of shares is transmitted via a FTP file to a transfer agent who issues shares in the fund. Moreover, the instruction generating component may be coupled to a FTP server so that the information relating to the purchase of securities is transmitted via a FTP file to a broker who purchases the securities. In addition, the instruction generating component may issue the shares and purchase the merchant securities.

The instruction generating component preferably generates the information relating to the issuance of shares and the purchase of securities by querying the stored rebate database information.

In yet another preferred embodiment, the present invention relates to a system for administering an investment fund, comprising: a membership registration component for registering members; a rebate tracking component that tracks rebates received from merchants based on purchases made by members at the merchants; and an instruction generating component that generates information relating to the issuance of shares in the investment fund to each respective member based on his respective determined rebates for a given period and generates instructions relating to the purchase of securities issued by each respective merchant as a function of the rebates received from that merchant during the given period.

In another preferred embodiment, the present invention relates to a system for administering an investment fund comprising: a membership registration component; a total purchase calculation component that calculates for each member a figure corresponding to that member's total purchase amount using a credit card during a period of time; a rebate tracking component that tracks rebates received from merchants based on member purchases at the merchants using the credit card; and an instruction generating component that generates information relating to the issuance of shares in the investment fund to each respective member based on their respective determined rebate amounts and the portion of the total purchase amount figure, and information relating to the investment of a portion of the total purchase amount figure and the rebates in the fund.

In yet another preferred embodiment, the present invention relates to a method of providing an investment fund comprising the steps of: registering members; calculating for each member a rebate corresponding to a percentage of that member's total purchase amount using a program credit card during a period of time; receiving rebates from the credit card issuer based on the rebate figure for each member during the period of time; investing the credit card issuer rebates in the fund; receiving rebates from merchants based on member purchases using the program credit card; and investing the merchant rebates in the fund; wherein the composition of the fund reflects at least in part the rebates received from the merchants. The step of investing the credit card issuer rebates in the fund preferably includes investing the rebates across the fund's then existing portfolio.

In another preferred embodiment, the present invention relates to a method of providing an investment fund comprising the steps of: registering members; calculating for each member a rebate corresponding to a percentage of that member's total purchase amount using a program credit card during a period of time; receiving rebates from the credit card issuer based on the rebate figure for each member during the period of time; and investing the credit card issuer rebates in the fund across the fund's then existing portfolio.

The term "securities" is used herein in its broadest sense to refer to stocks, bonds and all other instruments of the types regulated under the Securities Act of 1933, 15 U.S.C. 776 and under similar international regulations.

These and other features of the present invention will be better understood after reading the remainder of this application.

DETAILED DESCRIPTION OF THE PREFERRED EMBODIMENTS

The present invention offers members shares in an investment fund as an award for purchasing products or services from participating merchants who have agreed to provide predetermined rebates for such purchases. Advantageously, the investment find reflects the collective purchases that have been made by the members of the program because generally, and to the extent possible, every dollar received from each of the participating merchants through rebates (less any fees that may be charged by the administrator) is directed toward the purchase of that particular merchant's securities. As a result, the holdings in the investment fund are diversified. This innovative scheme makes the program of the present invention attractive to both merchants and customers. Merchants are attracted to the program because members become owners of the participating merchants via the diversified investment fund. Customers are attracted to the program because it is user-friendly and because they receive a diversified investment merely by purchasing products or services from one or more of the participating merchants.

According to a preferred e-commerce embodiment of the present invention, the invention provides a system and method for investing rebates that participating merchants provide in return for member purchases of products or services on their web sites. According to another embodiment of the present invention (which is discussed below), a similar investment program is provided that is based on credit card purchases that may be made both on-line and off-line.

Figure 1:
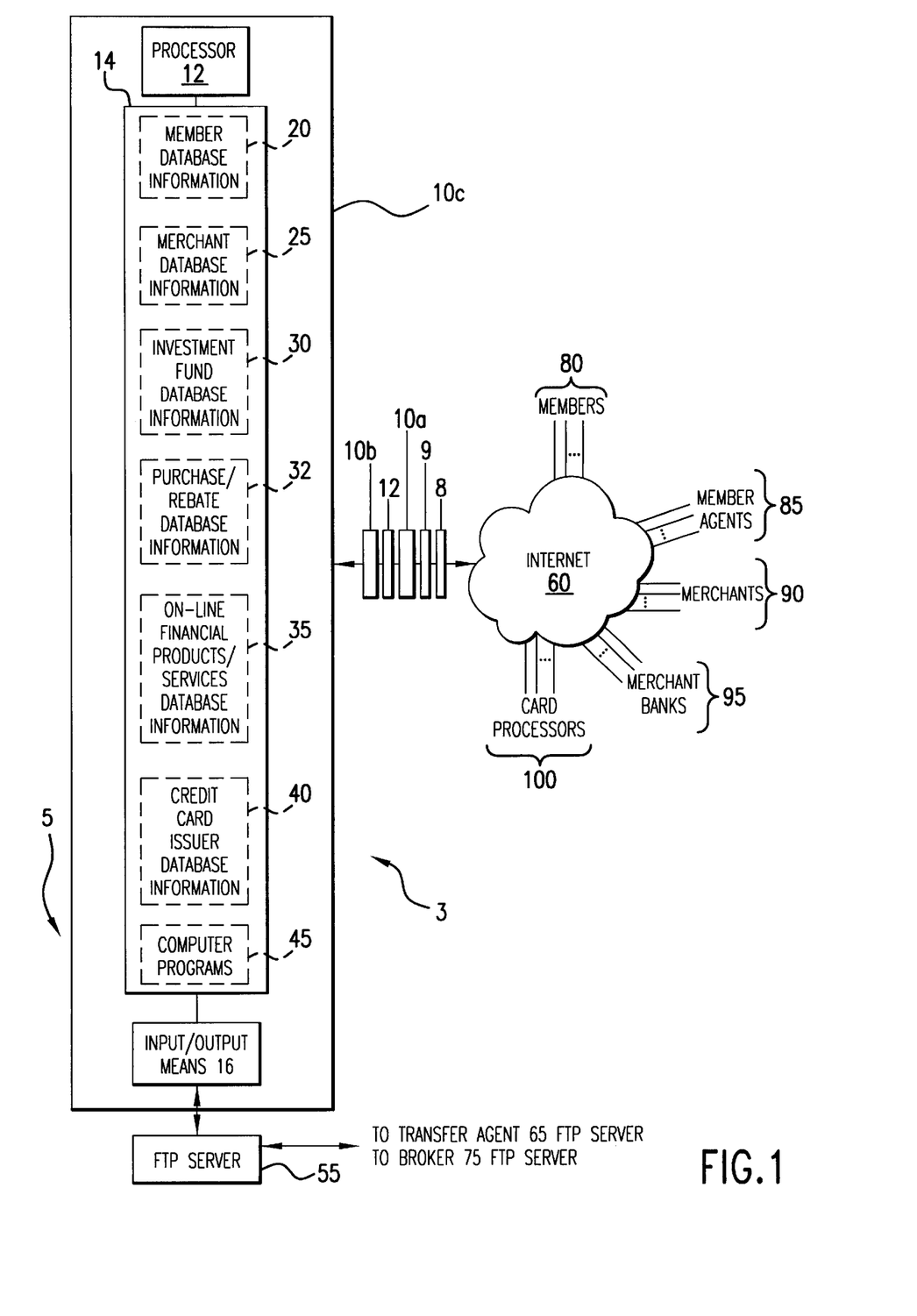
FIG. 1 is an illustrative block diagram of the system of the present invention.

The system and method of the e-commerce embodiment is now described in connection with the system diagram of FIG. 1, the flowchart of FIG. 2, and the high-level interaction diagram of FIG. 3. FIG. 1 is an illustrative block diagram of the system of the e-commerce embodiment of the present invention. As is shown, web server 10a is accessible via a communication network such as the Internet 60 to a plurality of members 80 using computers at their respective remote locations. (As used herein, the term "member" refers to a person, business, organization, or any other entity that is a customer of products or services and has registered with the system.) Member agents 85, merchants 90, merchant banks 95, and card processors 100 are also shown connected to the Internet. (The term "merchant" as used herein refers to any entity that manufactures or sells products or services.) As discussed in more detail below, the administrator system 3 may communicate with the merchant banks and card processors to identify member purchases at merchant web sites. The member agents 85 may be used as an intermediary between the merchants 90 and the administrator when collecting merchant rebate monies. While the system is preferably accessible via the Internet 60, any other suitable communication network such as a local area network, a wide area network, or a limited access network may be used.

Firewall 8, load balancer 9, application server 10b, firewall 12, database server 10c, file transfer protocol (FTP) server 55, transfer agent 65 and associated FTP server, and a broker 75 and associated FTP server are also shown in FIG. 1. Preferably, the administrator system 3 generally operates automatically under the supervision of the administrator 5. For reasons that will become clear, when the present invention is practiced in the United States, the administrator is preferably a broker/dealer registered under the Securities Exchange Act of 1934, as amended, 15 U.S.C. § 78a et seq., and an investment advisor registered under the Investment Advisors Act of 1940, as amended, 15 U.S.C. § 80a et seq.

Web server 10a contains the web site of the present invention, and is preferably accessible via the Internet through firewall 8. There may be more than one web server 10a if the load on the system so requires. Load balancer 9 provides load balancing between such servers. Application server(s) 10b provide information to/from the web server(s) 10a and database server 10c. As is shown in FIG. 1, another firewall 12 is preferably provided between the application server(s) 10b and the database server 10c.

Database server 10c preferably is a programmed general purpose computer that includes a processor 12, a memory 14 and an input/output means 16. The input/output means is used, among other things, to transmit and receive information to and from the FTP server 55. Memory 14 stores member information 20, merchant information 25, investment fund information 30, purchase/rebate information 32, on-line financial products/services information 35, and credit card issuer information 40 (used in connection with the credit card based customer loyalty program discussed below), and computer programs 45 for operating database server 10c in accordance with the invention.

The stored member database information 20 preferably includes for each member: a system identification number, a password, credit card information, social security number, and other information extracted from the member's completed registration form.

The stored merchant database information 25 preferably includes for each merchant that has agreed to provide rebates to members of the program: a system identification number and the discount(s) that the merchant has agreed to provide to members 80.

The stored fund database information 30 preferably includes information relating to the investment fund including the specific merchant security holdings in the fund, the number of shares in the fund owned by each member, and information regarding the fund's past and present performance. It may also include information relating to member accounts in other investment opportunities that are offered.

The stored purchase/rebate database information 32 preferably includes information concerning member purchases made at merchant web sites and information regarding rebate monies that are due from and have been received from the merchants. It also preferably includes information relating to each member's purchases with the credit card of the credit card based customer loyalty program of the present invention to be discussed below, and information regarding rebate monies that are due from and have been received from the credit card issuer of the credit card embodiment to be described below.

Products/services database 35 includes the other financial products or services that may be offered to members when they log onto the web site.

The stored credit card issuer database information 40 preferably contains information relating to the credit card issuer in the credit card based customer loyalty program of the present invention to be discussed below such as a system identification number for the credit card issuer and the rebate amount the credit card issuer has agreed to provide to members based on purchases using the credit card.

A redundant database server 10c may also be provided.

The FTP server 55 preferably communicates with the transfer agent's 65 and the broker's 75 FTP servers to transmit and receive information relating to the fund. As will be discussed below, the transfer agent 65 preferably administers the fluid under the direction of the administrator, and the broker 75 preferably purchases merchant securities under the direction of the administrator. In appropriate circumstances, the transfer agent 65 and the broker 75 may be affiliated. Moreover, the administrator may perform the functions of the transfer agent 65 and the broker 75.

In a preferred automated embodiment, the rebate monies received by the merchants are placed into an escrow account. Database server 10c and FTP server 55 periodically direct the transfer agent 65 to issue shares in the investment fund to members as a function of the rebates earned by the members. Database server 10c and FTP server 55 also periodically direct the broker 65 to purchase merchant securities as a function of the rebate monies received from the merchants and invested in the fund. The database server 10c and the FTP server 55 also preferably receive on-line redemption forms from members and direct the transfer agent 65 to process such share redemption forms. In an alternative automated embodiment, the database server 10c issues or directs the administrator to issue shares in the investment fund, purchases or directs the administrator to purchase the merchant securities, and receives redemption forms and processes or directs the administrator to process the redemption forms. Preferably, the receipt of rebate monies, the use of such monies to purchase shares and securities, and the receipt of the purchased shares and securities are handled by the administrator system 3 (and, as appropriate, by the transfer agent and the broker) as book entries without the need to send or receive money, checks or certificates for the shares and securities except for settlement purposes.

Figure 2:
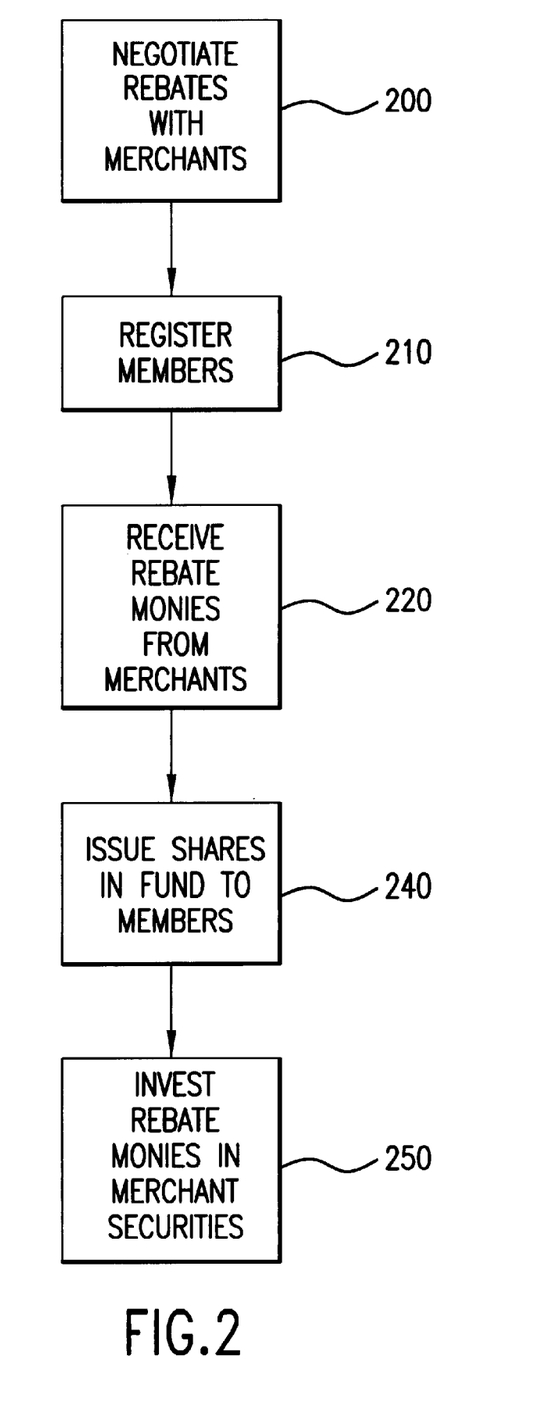
FIG. 2 is a flowchart that outlines the method of the e-commerce embodiment of the present invention.
Figure 3:
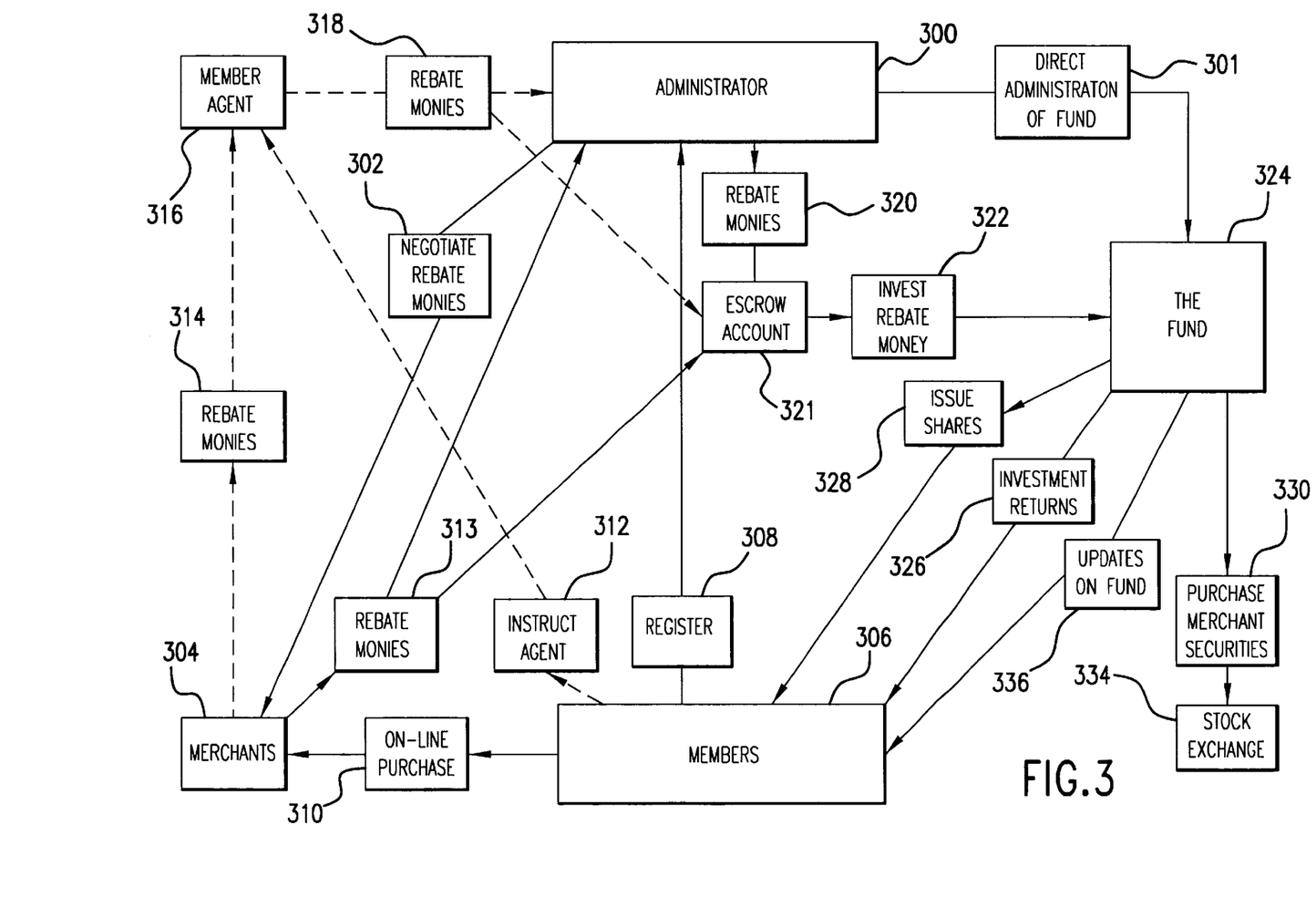
FIG. 3 depicts interactions between various parties using the system of the e-commerce embodiment of the present invention.

With reference to FIG. 2, the method of the e-commerce embodiment of the present invention includes the steps of negotiating rebate percentages with participating merchants (200), registering members (210), receiving rebates from merchants (220) in response to purchases made at participating merchant web sites, issuing shares (240) in the mutual fund to members as a function of the rebate monies received from merchants based on member purchases, and investing the rebate monies by purchasing merchant securities in proportion to the rebate monies received from the merchants (250).

The system and method of the e-commerce embodiment will now be further described in connection with FIG. 3, which shows the interactions between the system administrator 300, merchants 304, and members 306 according to the present invention. As illustrated by block 302, the administrator first negotiates a contract with various on-line merchants such that the merchants agree to rebate a percentage of the purchase price of products or services bought by members of the program. The contract may also include: a provision that the merchant agrees to pay the administrator a fee for the administrator's role in establishing and operating the system; a provision concerning the mechanics of tracking, calculating, and paying over the rebate monies to the administrator; and a provision concerning the merchant's web site content related to the system (e.g., a hyperlink to the system web site, a statement on the merchant's web site that it is a merchant participant in the system, and/or a statement on the merchant's web site listing the rebate percentage the merchant will offer to members 306.) The administrator, in turn, generally agrees to invest any rebates in the merchant's publicly traded securities in proportion to the rebate amounts received.

The administrator targets both public and private on-line merchants to participate in the program. Public merchants will find the program particularly desirable for a number of reasons:

1. Members become owners of the merchant's securities via the fund. The merchants thus benefit from a closer relationship with their customer/owners. Many in the industry say, "An owner is the best customer."
2. As discussed in more detail below, the system preferably maintains a customized home page with the fund's performance and composition information. On this page there are direct links to all of the merchant web sites. Whenever members log onto this system home page, they are reminded of the merchants, the good will extended by the merchants toward the members, and the fact that they have an ownership interest in the merchants.
3. Individual merchants benefit from the cross marketing inherent in the structure of the fund. That is, since the fund is composed of shares in public merchants based on rebates received by the members, each member will own not only the merchants at which he shops, but also the shares of other public merchants.
4. Merchants are able to offer their customers a tangible reward unlike any other currently available in the market. In a world of competition ever more defined by lowest price, they are able to reward customer loyalty in an innovative way which will forge a long-lasting relationship based on ownership, partnership, and good will.

Referring again to FIG. 3, as illustrated by block 308, members preferably register for the program using an on-line registration form available on the administrator web site. The member registration form asks the user to provide personal, demographic, and system related information such as name, password, social security number, address, gender, age, employer, and an e-mail address. The form may also request members to supply the basic details of any credit card they will use for on-line purchases. This credit card information is one way of enabling the administrator to identify member purchases at participating merchants 90 and subsequently bill the merchants for the rebate. The credit card details may include: 1) member name as it appears on the credit card; 2) type of credit card (e.g., Visa, MasterCard, Discover, and American Express); and 3) at least the last 5 digits on the credit card number.

The registration form also includes a user-friendly form for opening a securities account for the purchase, receipt and ownership of securities, such as shares of the fund of the present invention. When the present invention is practiced in the United States, the fund, which preferably is a mutual fund, and its shares are preferably registered under the Investment Company Act of 1940, as amended, and the Securities Act of 1933, as amended, 15 U.S.C. 78a et seq, respectively. The member, via the registration form, preferably provides the administrator with standing instructions to receive rebate monies earned by the member and invest such rebate monies in the fund.

In the event the SEC or other governmental agency or law requires separation of the investment fund from the handling of rebates, it may also be necessary to employ the services of one or more member agents 316 to: 1) receive rebate monies on behalf of the members, and 2) invest such rebate monies (less any fee that may be charged by the administrator) in the fund, or to forward such rebate monies to the administrator and into the escrow account 321. When the invention is practiced in the United States, the member agent will be a registered broker/dealer. Where a member agent is used, the registration process will also include the completion of an application for an account with the member agent and the submission of standing instructions to the agent to receive the rebate monies, and to invest the rebate monies in the fund or forward such monies to the administrator of the fund and into the escrow account 321. Following completion of the application and submission of the instructions, the member will have no need to further interact with the member agent.

Upon submitting the registration form, the database server 10c creates in the member database information 20 a file for the new member, extracts the information from the registration form, and preferably assigns a system identification number to the member.

Figure 4:
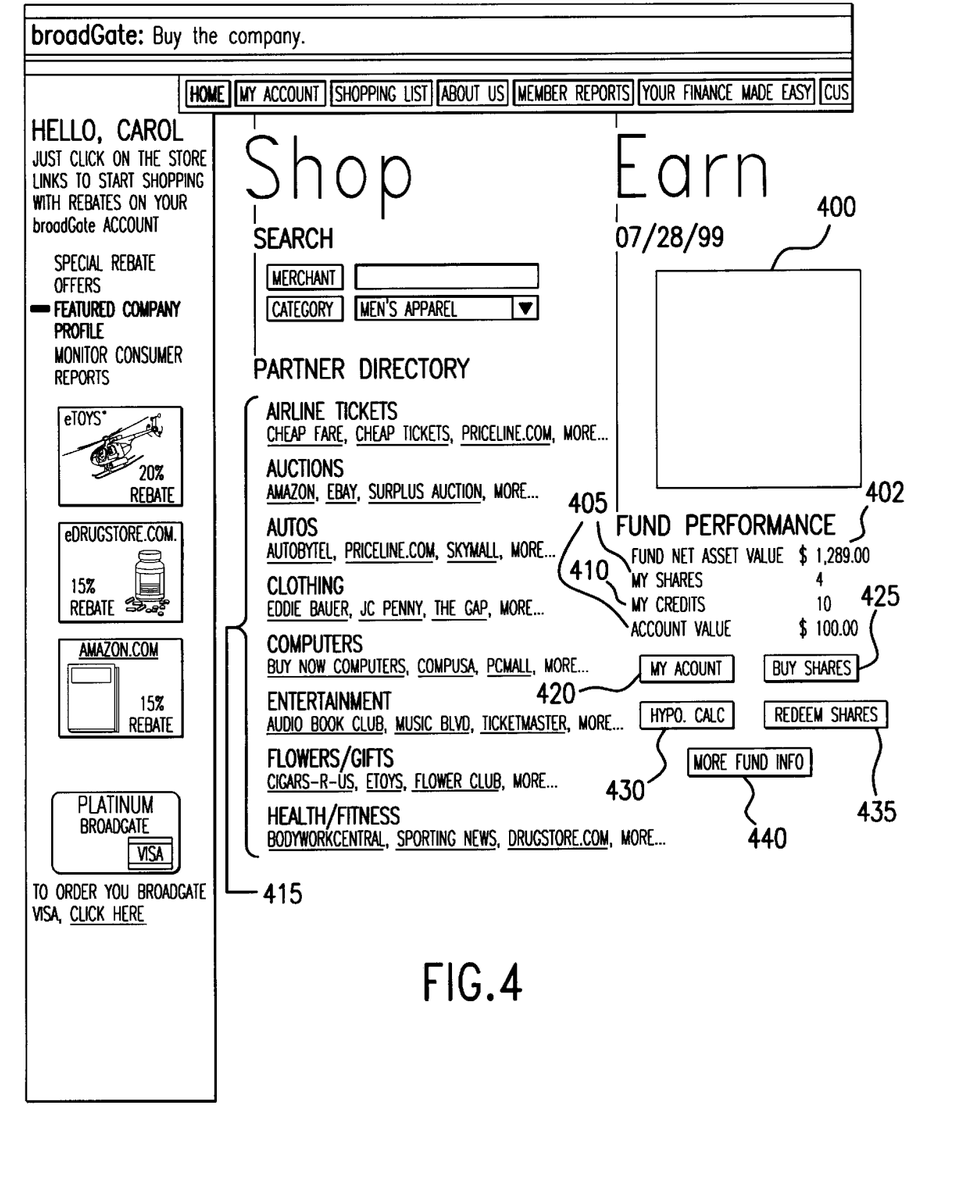
FIG. 4 is an illustrative member home page.

After the member's registration has been accepted, he receives a highly secure password or other secure identifier that preferably gives him access to a personalized home page through the administrator web site. To log onto his home page, the member navigates to the administrator web site and enters his password. As is shown in FIG. 4, each member's home-page preferably includes: a chart of the performance of the fund versus various benchmarks 400; summary information on the fund 402; summary information on the member's holdings in the fund 405; information on credits 410 that the member has received towards the purchase of shares in the fund as a result of his purchases; hyperlinks to merchant web sites 415; a button or similar mechanism 420 to access further information concerning the member's account; a button or similar mechanism 425 to make direct investments in the fund; a button or similar mechanism to access a hypothetical calculator allowing the member to approximate a future account value based on possible future rebates (e.g., the member is able to enter in a rebate value of $500 per year, and calculate the "hypothetical value" of his holding in 5 years, 20 years, etc. based on fund performance since inception); a button or similar mechanism 435 to redeem shares; and a button or similar mechanism 440 that provides access to more information concerning the fund. Promotional offers, advertisements, and other system product information and offerings may also be provided on the member web page.

Again referring to FIG. 3, a registered member of the program may make on-line purchases of goods or services from participating merchant web sites as shown by block 310. Advantageously, the member may access the merchant web sites by hyperlinks at several different areas of the administrator web site, e.g.,: 1) the registration form required for membership; 2) a page listing the merchants on the administrator web site; or 3) the member's home-page itself. These areas are continually updated by the administrator system 3 to include new merchants as the program expands. In the preferred embodiment, the member navigates to the administrator web site, and hyperlinks to a merchant web site in order to make a purchase at the merchant web site. As will be described below, this allows member purchase information to be easily tracked by the merchant and subsequently received by the administrator system 3. Alternatively, the member may directly log onto a merchant web site without first having to navigate to the administrator web site.

The preferred method of tracking member purchases will now be described. First, the member navigates to the administrator web site, and hyperlinks to any of the various merchants that are listed on the administrator web site. The administrator system then transmits an identifier tag to the merchant database server that identifies the transaction at the merchant web site as involving the specific administrator member. The identifier tag is then stored by the merchant database server along with the transaction information.

On some periodic basis, the merchant may then query its database server to retrieve all transactions within the period that include administrator identifier tags so as to build a FTP file that preferably includes the total rebate amount owed to the administrator for that period.

The merchant FTP server also transmits the FTP file to administrator FTP server 55. This file is then accessed by the database server 10c in order to automatically update the purchase/rebate database information 32. Specifically, the information is updated to reflect each individual member's purchases and the credits he has earned based on those purchases, and to reflect the purchases made at the merchant and thus the rebate monies owed to the administrator by the merchant.

In the preferred embodiment, the rebate monies are forwarded to the administrator or directly to the escrow account 321 as illustrated by blocks 313 and 320. However, as discussed above, if a member agent 316 is used, the merchant forwards the rebate monies to the member agent (as illustrated by block 314), and the member agent then forwards the rebate monies to the administrator or the escrow account 321 (as illustrated by block 318). These steps are shown in dotted lines to signify that they are not necessary if the administrator acts as the member agent. In any event, once the rebate monies have been received, the rebate database information 32 is updated to reflect that the rebate monies have been received. The rebate monies are preferably held in the segregated escrow account 321 for the benefit of the members until the rebate monies are invested in the fund; alternatively, the account may be an account where the administrator receives interest on the rebates until they are invested in the fund.

Those skilled in the art will recognize that it is not critical to the operation of the present invention how member purchases are identified, or how the rebate monies are routed to and received by the administrator. Thus, the foregoing description of a preferred method of identifying member purchases and subsequently receiving rebate monies from merchants should in no way limit the scope of the present invention. Other identifying methods may be used. By way of example and not limitation, the member may be asked to input a special administrator e-mail address that has been assigned to him when making purchases at merchant web sites. The merchant sites may then transmit the details of the purchase to the administrator or the administrator system 3 via the member's special administrator e-mail address, and automatically forward the appropriate rebate amount to the administrator. Alternatively, the merchant could just transmit the details of the purchase and await rebate billing instructions from the administrator.

Many other mechanisms may also be used. For example, member purchases that are made via an electronic wallet could be tracked. An electronic wallet may contain electronic debit or electronic credit card information. If an electronic wallet member purchase tracking methodology is used, the member would first register for the electronic wallet on the administrator web site, and an electronic wallet application would be downloaded onto the member's computer. When the member makes purchases using the electronic wallet, the transaction information would automatically be sent to the database server 10c. The database server 10c may then extract the relevant member purchase and merchant information and store such information in the purchase/rebate database information 32.

Still further, the system can be set up such that when a member clicks on a merchant on the administrator web site, he receives a co-branded web page between the administrator and the merchant. Such web pages can be maintained on the administrator web server 10a or the merchant's web server. In the case where the administrator web server 10a provides the co-branded web pages, member purchases on such pages are tracked by the database server 10c. In the case where the merchant's web server provides the co-branded web pages, the merchant's web server tracks member purchases. The merchant can then transmit the details of member purchases to the administrator or the database server 10c, and forward the appropriate rebate amount to the administrator. Alternatively, the merchant can just transmit the details of the purchase and await rebate billing instruction from the administrator.

Figure 5:
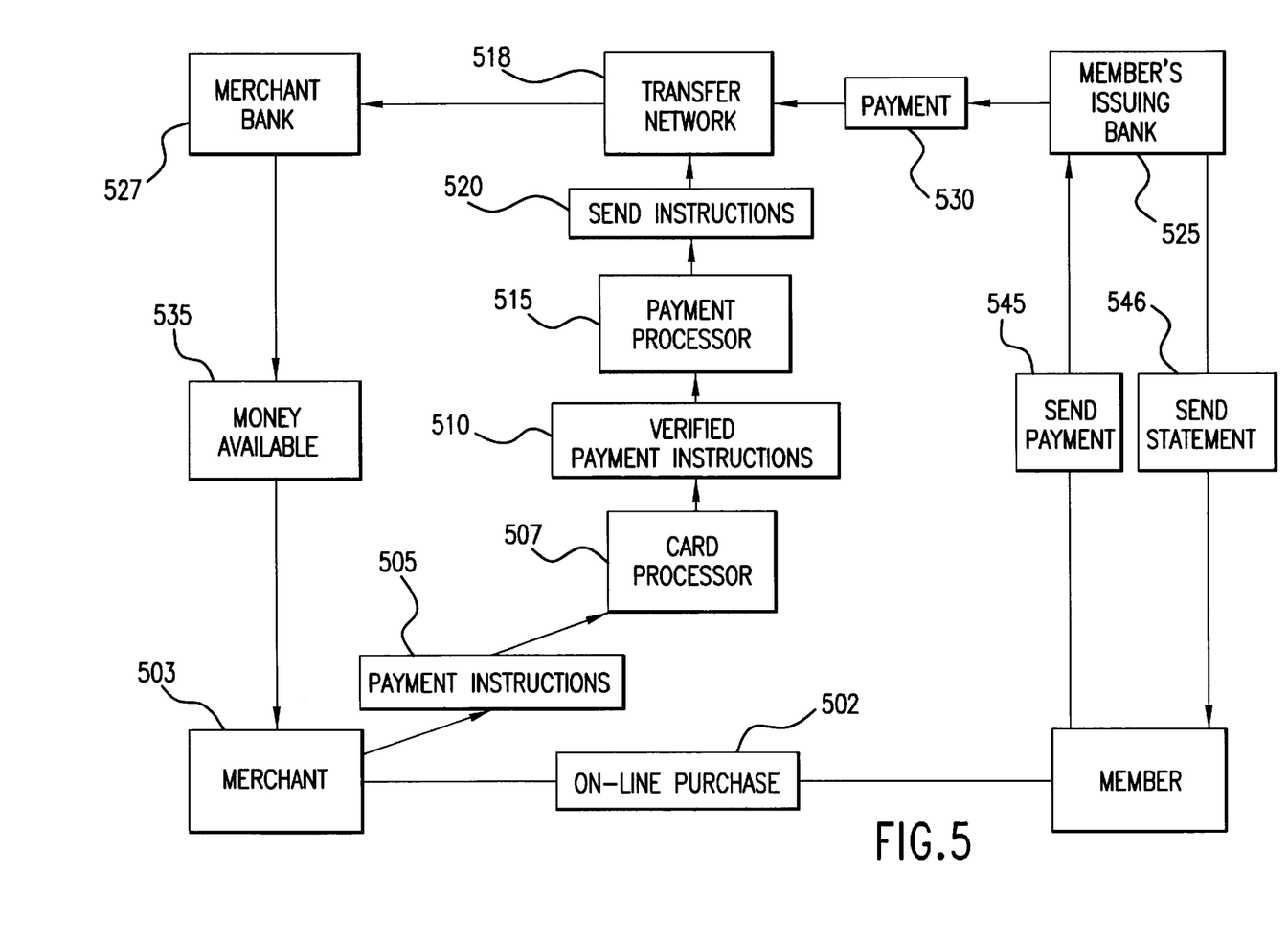
FIG. 5 depicts one payment process when members make on-line purchases at merchant web sites.

The administrator and the merchants could also track member purchases using credit card information. In this tracking methodology, a member may make on-line purchases with any credit card he wishes provided he has supplied the administrator with the credit card details via the registration form or through some other means. The payment process when members make on-line purchases is depicted in FIG. 5. A member 500 first makes an on-line purchase 502 with a merchant 503. The merchant then sends electronic instructions 505 to a card processor 507, including all relevant credit card, identification, and purchase details. The card processor then makes various credit checks and relays instructions 510 to a payment processor 515. Next, the payment processor uses a secure transfer network 518 to instruct 520 the member's card issuing bank 525 to transfer funds to the merchant bank 527. In response, the card issuing bank transfers money 530 via the transfer network to the merchant bank 527 so that the merchant bank has the money available 535 to the merchant one day later. Finally, the card issuing bank sends a monthly credit card bill 540 to the member, and the member pays his credit card bill.

The database server 10c or the administrator would then use the credit card and member information from the registration form to identify member purchases at merchant sites. To identify such member purchases, the administrator system or the administrator may periodically (e.g., daily, weekly, monthly, etc.) supply the merchant's card processors and merchant banks with information sufficient to locate member purchases that have been made at merchant web sites. For example, the administrator may supply to the card processors and merchant banks: 1) member name as it appears on the registered credit card(s); 2) type of credit card (e.g., Visa, MasterCard, Discover, or American Express); and 3) the last 5 digits on the credit card number(s). With such information, the card processors and merchant banks run a database search on purchases made by the members at merchant sites. The purchase information generated by this search is then supplied to the administrator system or the administrator, and the administrator subsequently bills the merchant for the rebate. The stored rebate/purchase information 32 would then be updated to reflect member purchases, and by extension, credits they have earned towards shares in the fund, and the rebate monies owed by the merchants to the administrator. In a preferred embodiment, this activity is completed on-line using the administrator system and the computer systems of the merchant banks and card processors.

The preferred method of converting the credits members have earned through their purchases at merchant sites into fund shares will now be described. The database server 10c periodically (preferably monthly) queries the member purchase/rebate information 32 to locate member accounts that have total rebate amounts that exceed a specified minimum amount (e.g., the minimum amount may be less than $100.00, e.g., $10.00). The result of the query is then compiled into a FTP file and sent to a FTP server at the transfer agent 65. The administrator also causes monies in the escrow account 321 corresponding to these rebate amounts (less any fees that may be charged by the administrator) to be forwarded to the transfer agent 65 so that the monies can be invested in the fund 324.

The transfer agent's FTP server processes the file and the transfer agent 65 issues shares in the fund to the appropriate members as depicted by block 328. The dollar value of the shares equals the dollar value of the rebates (less any fee that may be charged by the administrator) which each member received on his online purchase of products or services from the merchants. The transfer agent's FTP server confirms the share purchases by sending a confirmation file to the administrator FTP server 55. This confirmation file is then accessed by the server database 10c in order to automatically update the stored investment fund information 30 to reflect the updated member share information. Other electronic means that can provide the relevant information to/from the administrator system 3 and the transfer agent may also be used. As mentioned above, the administrator may perform the functions of the transfer agent 65.

In any event, an electronic confirmation of the fund share purchase is preferably provided to each member by the administrator system. Preferably, the confirmation is transmitted by e-mail, and each member's home page is accordingly updated as well. The preferred embodiment of purchasing merchant securities will now be described. First, the database server 10c preferably queries the stored purchase/rebate information 32 to determine what merchant securities should be purchased and in what amounts. Specifically, in the preferred automated embodiment, the database server 10c calculates the amount of rebate monies received from each public merchant and invested in the fund. Server 10c also preferably calculates the rebate monies received from private merchants and invested in the fund so that these monies may be invested across the fund's then existing portfolio. This information is then compiled into an FTP file that is sent via the administrator FTP server 55 to the broker's 75 FTP server.

The rebates monies are preferably invested as follows: First, to the extent that a merchant is, or is a subsidiary of, a publicly traded entity (a public merchant) listed on a nationally recognized United States securities market or international securities market (e.g., the NYSE, the NASDAQ Stock Market, the London Stock Exchange, Tokyo Stock Exchange, etc.), the rebate monies received from the merchant are invested in shares of equity securities of that merchant or that merchant's publicly traded (ultimate) parent company. Second, to the extent that a merchant or its parent is not a publicly traded entity (a private merchant) listed on a nationally recognized United States securities market or international securities market, then the rebate monies received from the merchant are preferably invested across the fund's then existing portfolio. Alternatively, such private merchant rebate monies could be invested in other publicly traded companies. Third, the fund, may at the discretion of the administrator, invest rebate monies or other amounts invested in the fund (or reallocate rebate monies received from a specific merchant to shares of companies other than that merchant) to maintain the fund's diversification as may be required by SEC or other international regulations. Fourth, the fund, at the discretion of the administrator, may retain certain amounts in cash or invest in other securities.

The broker 75 purchases the merchant securities (as illustrated by block 330) as directed by the administrator and transmits a confirmation FTP file to the administrator FTP server 55. The server database 10c then accesses the confirmation file and automatically updates the stored investment fund information 30 to reflect the security purchases.

Instead of sending an FTP file to the broker, the database server 10c may simply generate information regarding what merchant securities should be purchased, and the administrator could then simply provide the purchase information to the broker verbally, in writing, or by some other electronic means. If a transfer agent 65 is used, the broker 75 or the administrator preferably provides the security purchase information to the transfer agent 65 via an FTP file, via other electronic means, or through other available means. As mentioned above, the administrator may perform the functions of the broker 75.

As illustrated by block 336, the administrator periodically provides information concerning the fund to its members. In the preferred embodiment, the transfer agent periodically provides fund information to the administrator via an FTP file, via other electronic means, or through other available means, and such information is compiled by the administrator system and provided on member home pages and/or e-mailed to the members. For example, information concerning the fund such as reports, statements, forms, and general correspondence is made available on member home pages and/or is e-mailed to the members via the server.

The fund 324 provides investment returns to the members as shown by block 326. Of course, the value of a member's investment in the fund is subject to not only his rebates, but also the performance of the fund itself. Just like any fund, the value of the fund rises and falls with the value of its underlying securities. When a member seeks to redeem all or some of his shares in the fund for cash, he is required to send a redemption form to the administrator. The form is preferably available on-line at the member home-page, as is illustrated by button 435 of FIG. 4.

The redemption requests are preferably accepted and processed on a periodic basis such as daily or quarterly. In the preferred embodiment, the redemption form is received on-line by the database server 10c, compiled into an FTP file, and sent via administrator FTP server 55 to the transfer agent's 65 FTP server. The transfer agent then processes the redemption form, and sends a confirmation file to the administrator FTP server 55. The server database 10c then accesses the file, and updates the stored investment fund information 30. Other electronic means that can provide the relevant information to/from the administrator system 3 and the transfer agent may also be used.

An illustrative example of the operation of the e-commerce embodiment of the present invention will now be described. (It should be noted that this example, for the purposes of clarity, does not take into account any fees that the administrator may charge relating to the administration of the fund.) In this example, the administrator has negotiated a rebate of 10% with three participating merchants (e.g., Amazon.com, CDNow.com, and Sharper Image.com.), and has registered three members (Max, Mary, and Sam).

All three members then purchase goods on-line over a given period. Their purchases, rebates at each merchant, and the composition of the fund based on the rebates, are listed below:

|  | Max | Mary | Sam | Total |
|---|---|---|---|---|
| Purchase at Amazon | $3000 | $1000 | $1000 | $5000 |
| Rebate at Amazon | $300 | $100 | $100 | $500 |
| Purchase at CDNow | $1000 | $0 | $2000 | $3000 |
| Rebate at CDNow | $100 | $0 | $200 | $300 |
| Purchase at Sharper Image | $0 | $3000 | $1000 | $4000 |
| Rebate at Sharper Image | $0 | $300 | $100 | $400 |
| Value of fund holdings | $400 | $400 | $400 | $1200 |

Composition of the fund:

| 1. | Amazon | $500 |
|---|---|---|
| 2. | CDNow | $300 |
| 3. | Sharper Image | $400 |
| Value of the fund: |  | $1200 |

As a result of the purchases, and the agreed contract and rebate system, each merchant forwards a rebate to the administrator or to the member agent as follows: Amazon forwards a $500 rebate, CDNow forwards a $300 rebate, and Sharper Image forwards a $400 rebate. Such rebate monies are preferably held in an escrow account for the benefit of the members. Because this total rebate amount figure is above the illustrative minimum amount discussed above ($10.00), the rebate monies in the escrow account are invested in the fund. Accordingly, the files of Max, Mary and Sam in the stored investment fund database information 30 will show that they have $400 worth of shares in the fund. Pursuant to the preferred investment method of the present invention, the fund will purchase $500 worth of Amazon securities, $300 worth of CDNow securities, and $400 worth of Sharper Image securities in the open market. The files of Amazon, CDNow, and Sharper Image in the stored investment fund database information 30 will reflect these security purchases.

The fund provides no investment return in this example since the above is a "day one" scenario. If, for example, the value of the above stocks were to increase by 10%, the value of the overall portfolio would grow to $1320 and the value of each individual account would grow to $440. Also note that while Max purchased nothing from Sharper Image, he is nevertheless an owner of Sharper Image via the fund. As discussed above, if the administrator receives rebate monies from a private merchant, it preferably invests the monies as a function of the fund's then existing portfolio. Thus, in this example, if the administrator were to receive $120 in rebate monies from private merchants, such rebate monies would be invested as follows: $50 in Amazon, $30 in CDNow, and $40 in Sharper Image.

Advantageously, members may also choose to make direct investments in the fund. Such investments may be completed at the administrator web site via a credit card purchase. As shown in FIG. 4, this may be completed at the member home page by clicking on button 425. Additionally, members may elect to make direct investments in the fund through direct deposit arrangements, checks submitted to the administrator, or through other payment mechanisms. Once the direct investment purchase is made, the purchase/rebate stored information 32 is preferably automatically updated to reflect this activity. Advantageously, database server 10c may periodically calculate the total amount of such direct investments in the escrow account, add it to the total amount of rebates received from private merchants, and invest or direct the broker agent 75 to invest the total amount across the fund's then existing portfolio.

The credit card embodiment of the present invention will now be described. In this embodiment, customers become members of this portion of the program by completing a registration form that is similar to the form completed in the e-commerce embodiment. The registration form in this embodiment, however, also includes an application for a credit card, which in the preferred embodiment is a co-branded credit card between the administrator and a credit card issuer (e.g, Citibank). The credit card issuer has agreed to pay rebates based on purchases made with the card.

The credit card issuer periodically calculates the total amount of purchases made by each member using the credit card, and pays to the administrator a rebate amount based on the total amount of purchases made by members using the card. The stored purchase/rebate information 32 is updated to reflect this activity. The rebate monies are held in the escrow account 321 until the monies are invested in the fund. As described above in connection with the e-commerce embodiment, such investment is preferably done periodically. Like the rebate monies received from private merchants in the e-commerce embodiment, this rebate money is preferably invested as a function of the fund's then existing portfolio. Alternatively, the rebate monies may be invested in other publicly traded companies to maintain a diversified portfolio.

Similar to the e-commerce embodiment, the administrator has also preferably negotiated rebates with participating merchants such that the merchants have agreed to provide rebates to members who purchase products either on-line or off-line using the credit card. Member purchases using the credit card are identified, and rebate monies received from the participating merchants by the administrator are invested in the find in a manner similar to that described in connection with the e-commerce embodiment. The fund then issues shares to the appropriate member investment accounts based on the rebate monies received, and may purchase securities according to the same algorithm that is used in the e-commerce embodiment.

As can now be seen, this credit card embodiment gives the members greater flexibility as to how (either off-line or on-line) and where they purchase products and services, while still providing a diversified investment in return for their purchases. The credit card embodiment may include investing only those rebate monies received from the credit card issuer, or investing rebate monies received from the credit card issuer and the merchants. In addition, the credit card embodiment may be offered alone or in combination with the e-commerce embodiment.

While the invention has been described in conjunction with specific embodiments, it is evident that numerous alternatives, modifications, and variations will be apparent to those skilled in the art in light of the foregoing description. For example, while in the preferred embodiments, the database server 10c automatically updates its stored information to reflect member purchases, rebate monies owed to and received by the administrator, and information relating to the member's accounts and the find, the administrator may gather some or all of this information via other means and input such information into the database server 10c. Moreover, many of the administrator functions described above in connection with the e-commerce and credit card embodiments may be outsourced by the administrator. For example, the tracking of member purchases, the billing of merchants for rebate monies, and the receipt of such rebate monies may be performed by an entity under the general direction of the administrator. Moreover, the administration of the escrow account that holds the rebate monies may be outsourced. In such cases, the relevant system information is provided (preferably electronically) to the administrator, inputted into the database server 10c, and maintained in the database server 10c.

What is claimed is:

1. A method of providing an investment fund comprising the steps of:
   registering members;
   receiving rebates from merchants based on purchases made by the members from the merchants; and
   investing the rebates in or through the investment fund;
   wherein the investment fund includes securities of at least one of the merchants.

2. A method of providing an investment fund based on rebates received from on-line purchases comprising the steps of:
   registering members;
   receiving rebates from on-line merchants based on purchases made by the members at the on-line merchants;
   investing the rebates in or through the investment fund;
   issuing shares in the investment fund to each respective member based on the rebates received from the on-line merchants as a result of purchases made by that member; and
   purchasing securities of the on-line merchants based on the rebates received from that on-line merchant.

3. A method of providing an investment fund based on rebates received from on-line purchases comprising the steps of:
   registering members using a computer;
   identifying member purchases made at the on-line merchant sites;
   receiving rebates from the merchants based on member purchases;
   investing the rebates in or through the investment fund;
   issuing shares in the investment fund to each member based on the rebates received from merchants as a result of purchases made by that member; for rebates received from public merchants, purchasing securities of the public merchants based on the amount of rebates received from the merchants; and for rebates received from private merchants, purchasing securities in the public merchants as a function of the investment fund's then existing portfolio.

4. A method, using a computer, of directing management of an investment fund based on rebates received from on-line purchases comprising the steps of:
   registering members using a computer;
   maintaining storage information including member database information relating to participating members, merchant database information relating to merchants that have agreed to provide rebates for member purchases, rebate database information, and investment fund database information;
   receiving rebate data information from the on-line merchants relating to member purchases made at the on-line merchants;
   updating the stored rebate database information; and
   generating information relating to the issuance of shares in the investment fund to each respective member based on the rebate data information and information relating to the purchase of securities issued by the on-line merchants based on the rebate data information.

5. A system for administering an investment fund, comprising:
   means for registering members;
   means for receiving rebates from merchants based on member purchases made at the merchants;
   means for investing the rebates in or through the investment fund;
   means for issuing shares in the investment fund to each respective member based on rebates received as a result of his purchases; and
   means for purchasing securities issued by the merchants as a function of the rebates received from the merchants.

6. A system for administering an investment fund based on rebates received from on-line purchases comprising:
   a computer system accessible for on-line communication, the computer system comprising:
   a storage that maintains member database information relating to participating members, merchant database information relating to merchants that have agreed to provide rebates for member purchases, rebate database information, and investment fund database information; and
   an instruction generating component that generates information relating to the issuance of shares in the investment fund to each respective member based on the amount of rebates received from merchants as a result of purchases made by that member and also generates information relating to the purchase of securities issued by the merchants based on the rebates received from the merchants.

7. The system of claim 6, wherein the instruction generating component is coupled to a FTP server and the information relating to the issuance of shares is transmitted via a FTP file to a transfer agent who issues shares in the fund.

8. The system of claim 6, wherein the instruction generating component is coupled to a FTP server and the information relating to the purchase of securities is transmitted via a FTP file to a broker who purchases the securities.

9. The system of claim 6, wherein the instruction generating component issues the shares and purchases the merchant securities.

10. The system of claim 6, wherein the instruction generating component generates the information relating to the issuance of shares by querying the stored rebate database information.

11. The system of claim 6, wherein the instruction generating component generates the information relating to the purchase of securities by querying the rebate database information.

12. A system for administering an investment fund, comprising:

a membership registration component for registering members;

a rebate tracking component that tracks rebates received from merchants based on purchases made by members at the merchants; and an instruction generating component that generates information relating to the issuance of shares in the investment fund to each respective member based on his respective determined rebates for a given period and generates instructions relating to the purchase of securities issued by the merchants as a function of the rebates received from the merchants during the given period.

13. A method of providing an investment fund comprising the steps of:

registering members;

calculating for each member a rebate corresponding to a percentage of that member's total purchase amount using a credit card during a period of time;

receiving rebates from the credit card issuer based on the rebate figure for each member during the period of time;

investing the credit card issuer rebates in or through the investment fund;

receiving rebates from merchants based on member purchases using the credit card; and investing the merchant rebates in or through the investment fund; wherein the investment fund includes securities of at least one of the merchants.

14. The method of claim 13, wherein the step of investing the credit card issuer rebates in the fund includes investing the rebates across the fund's then existing portfolio.

15. A method of providing investments based on rebates received from purchases comprising the steps of:

registering members;

receiving rebates from merchants into a fund for investment, the rebates based on purchases made by the members at the merchants;

purchasing securities with the rebates received into the fund, the securities purchased including securities of the merchants, and issuing shares to the members, each member receiving a share based on the rebates received from the merchants as a result of purchases made by that member.

16. The method of claim 15 wherein the fund for investment further comprises a mutual fund, and wherein the shares issued to the members further comprise mutual fund shares.

17. The method of claim 15 wherein the shares issued to the member further comprise merchant securities.

18. The method of claim 15 wherein the merchant securities are purchased in amounts based on the rebates received into the fund from that merchant.

19. The method of claim 15 wherein the merchant securities comprise shares of equity securities.

20. A system for administering investments based on rebates received from purchases comprising:

a computer system accessible for communication, the computer system including
  (i) a storage for maintaining
    database information relating to registered members,
    database information relating to merchants that have agreed to provide rebates for member purchases, and
    database information relating to a fund for investment; and
  (ii) an instruction generating component for generating
    information relating to registration of members,
    receipt of rebates from merchants into the fund, the rebates based on purchases made by the members at the merchants,
    purchase of securities with the rebates received into the fund, the securities purchased including securities of the merchants,
    issuance of shares from the fund to the members, each member receiving a share based on the rebates received from the merchants as a result of purchases made by that member, and
    update of database information in the storage.

21. The method of claim 20 wherein the fund for investment further comprises a mutual fund, and wherein the information generated relating to the issuance of shares further comprises information relating to shares of the mutual fund.

22. The method of claim 20 wherein the information generated relating to the issuance of shares further comprises information relating to shares of the merchant securities.

* * * * *

UNITED STATES PATENT AND TRADEMARK OFFICE
CERTIFICATE OF CORRECTION

PATENT NO.      : 6,345,261 B1
DATED           : February 5, 2002
INVENTOR(S)     : Feidelson et al.

Page 1 of 1

It is certified that error appears in the above-identified patent and that said Letters Patent is hereby corrected as shown below:

<u>Column 16,</u>
Line 66, cancel beginning with "7. The system of claim 6" to and including "in the fund." in column 17, line 2, and insert the following claim:

7. The system of claim 6, wherein the instruction generating component is coupled to a FTP server and the information relating to the issuance of shares is transmitted via a FTP file to a transfer agent who issues shares in the investment fund.

<u>Column 17,</u>
Line 7, cancel beginning with "9. The system of claim 6" to and including "chant securities." in column 17, line 9, and insert the following claim:

9. The system of claim 6, wherein the instruction generating component issues the shares in the investment fund and purchases the merchant securities.

Line 10, cancel beginning with "10. The system of claim 6" to and including "information." in column 17, line 13, and insert the following claim:

10. The system of claim 6, wherein the instruction generating component generates the information relating to the issuance of shares in the investment fund by querying the stored rebate database information.

Signed and Sealed this

Tenth Day of September, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,345,261 B1 Page 1 of 1
DATED : February 5, 2002
INVENTOR(S) : Feidelson et al.

It is certified that error appears in the above-identified patent and that said Letters Patent is hereby corrected as shown below:

Title page,
Item [22], should read:

-- [22] Filed: September 21, 1999 --

After Item [22], insert the following:

-- Related U.S. Application Data

[60] Provisional application No. 60/135,450 filed on May 21, 1999. --

Column 1,
Line 3, after the title, insert the following:

-- CROSS-REFERENCE TO RELATED APPLICATION

This application claims priority to U.S. provisional application Serial No. 60/135,450, filed on May 21, 1999.

Column 18,
Line 46, replace the word "method" with -- system --.
Line 51, replace the word "method" with -- system --.

Signed and Sealed this

Twenty-fourth Day of December, 2002

JAMES E. ROGAN
*Director of the United States Patent and Trademark Office*